W. J. PIERPONT, Jr.
FLOAT FOR LOGS.
APPLICATION FILED OCT. 31, 1908.
925,221.
Patented June 15, 1909.
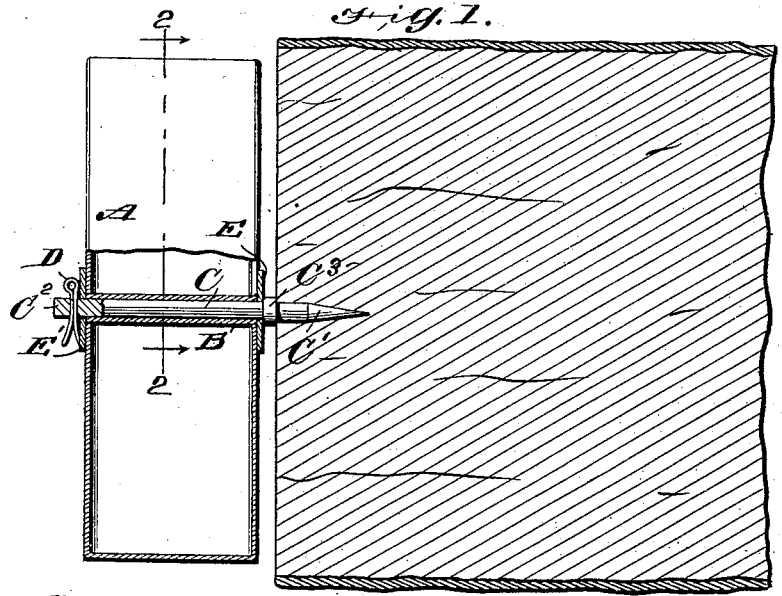
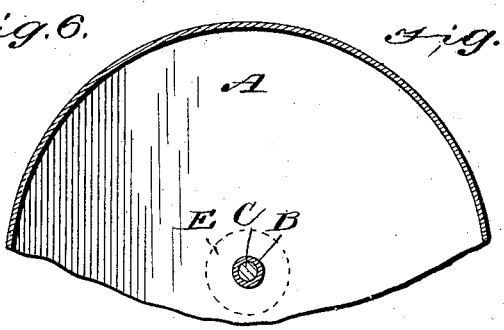
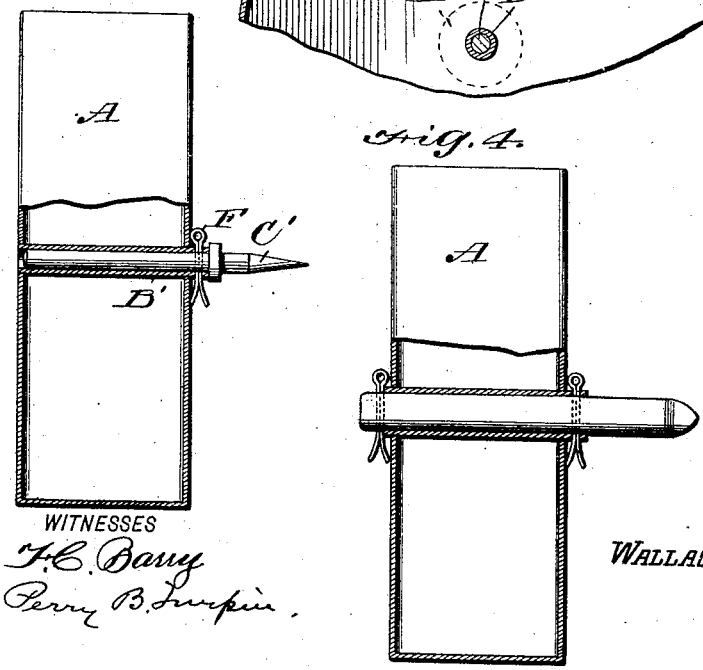
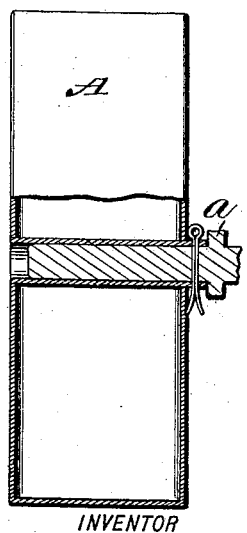
WITNESSES
INVENTOR
WALLACE J. PIERPONT Jr
BY
ATTORNEYS

UNITED STATES PATENT OFFICE.

WALLACE J. PIERPONT, JR., OF SAVANNAH, GEORGIA.

FLOAT FOR LOGS.

No. 925,221.   Specification of Letters Patent.   Patented June 15, 1909.

Application filed October 31, 1908. Serial No. 460,498.

*To all whom it may concern:*

Be it known that I, WALLACE J. PIERPONT, Jr., a citizen of the United States, and a resident of Savannah, in the county of Chatham and State of Georgia, have invented certain new and useful Improvements in Floats for Logs, of which the following is a specification.

This invention is an improvement in floats or buoys for logs; and the invention consists in certain novel constructions and combinations of parts as will be hereinafter described and claimed.

In the drawings, Figure 1 is a sectional elevation of my improved float as in use. Fig. 2 is a cross section on about line 2—2 of Fig. 1. Fig. 3 is a sectional elevation showing a somewhat different construction for connecting the fastening pin to the buoy body, and Figs. 4, 5 and 6 illustrate constructions in which a wooden fastening pin may be used instead of the metal pin shown in Figs. 1, 2 and 3.

The float has a body A, preferably of metal in cylindrical form and having opposite flat faces, and a tube B extending between the same, the tube being shown as open at both ends so a fastening pin may extend into or through the same, the said pin protruding at one end to enter a log.

In the construction shown in Figs. 1, 2 and 3 the pin is of metal and has a pointed portion C' which may be driven into a log as shown in Fig. 1.

In the construction shown in Fig. 1, the pin C has a shank like portion which extends into and through the tube B and beyond the outer end of the tube as shown at C², Fig. 1, so the fastening cotter D may be passed through the outer end of the pin to retain the same in connection with the float body, the said pin having a collar C³, and washers E, and E' being arranged between the shoulder C³ and the cotter D and their respective faces of the float body. This construction may be preferred in some instances because it provides for securing the fastening pin to the float body in such manner that the float body may revolve upon the pin.

In Fig. 3, I show a somewhat different construction in which the central tube of the float projects at B' beyond the inner face of the float body and such tubular extension is preferably in line with the perforation in the fastening pin to receive a cotter F. This construction may be preferred in some instances as it avoids any projection beyond the outer face of the float body such as would tend to injure other buoys in the event of the butting together of buoys in the use of the invention.

While the use of metal pins may be preferred for some reasons, it may be desirable in some instances to employ wooden pins as shown in Figs. 4 and 5, in which event the pins may be secured in the manner shown in Fig. 4, by cotter pins passed through the pins at the opposite sides of the buoy body, or as shown in Fig. 5, by a construction similar to that shown in Fig. 3. These wooden pins may be driven into holes bored in the ends of logs, while the metal pins may be driven directly into the logs, or into previously bored holes as may be found desirable in the practical use of the invention.

In forming the shoulders C³, it is preferred to flange the fastening pins, this flange forming not only a stop to limit the fitting of the pin in the buoy body, but also as a seat for engagement by a removing device when it is desired to remove the pin from the log. The wooden pins as shown in Fig. 5, may be secured by separate wooden pins as illustrated in Fig. 6, or a piece of wire may be employed to secure the pin to the float or buoy in the construction shown in Fig. 5.

In operation the fastening pin or spike may be driven into the log or timber and the buoy body be then secured upon the pin as before described, and when the log has reached its destination the float including its fastening pin may be withdrawn from the log thus avoiding the use of any nails or other metallic fastening which may be broken off in the logs and injure saws or other tools used in working the logs.

When wooden pins are used they are to be sawed off or simply left in the log upon reaching destination.

I claim—

1. A float or buoy for logs comprising a hollow body having a tube extending through it and open at both ends, and a fastening pin having a shank like portion fitted in the tube and perforated near its outer end for a cotter pin, a flange on the other protruding end of the fastening pin, a cotter through the said perforation, and washers between the said cotter and flange and the float body, substantially as set forth.

2. A float or buoy for logs having a pin tube and a pin held at one end in such tube and protruding at its other end to enter a log.

3. A float or buoy for logs having a central tube open at its end, and a pin having a portion fitting in such tube and a portion protruding beyond the face of the float to enter a log, substantially as set forth.

4. A float or buoy for logs comprising a body having a pin tube, a float fastening pin fitting in said tube, and securing means at the opposite ends of said tube.

5. A float or buoy for logs combined with a fastening device, having means for connection with a log, and means for detachably securing the float to the fastening device, the float being revoluble upon its fastening device.

WALLACE J. PIERPONT, Jr.

Witnesses:
PORTER G. PIERPONT,
WM. W. BREWIN.